Figure 1:
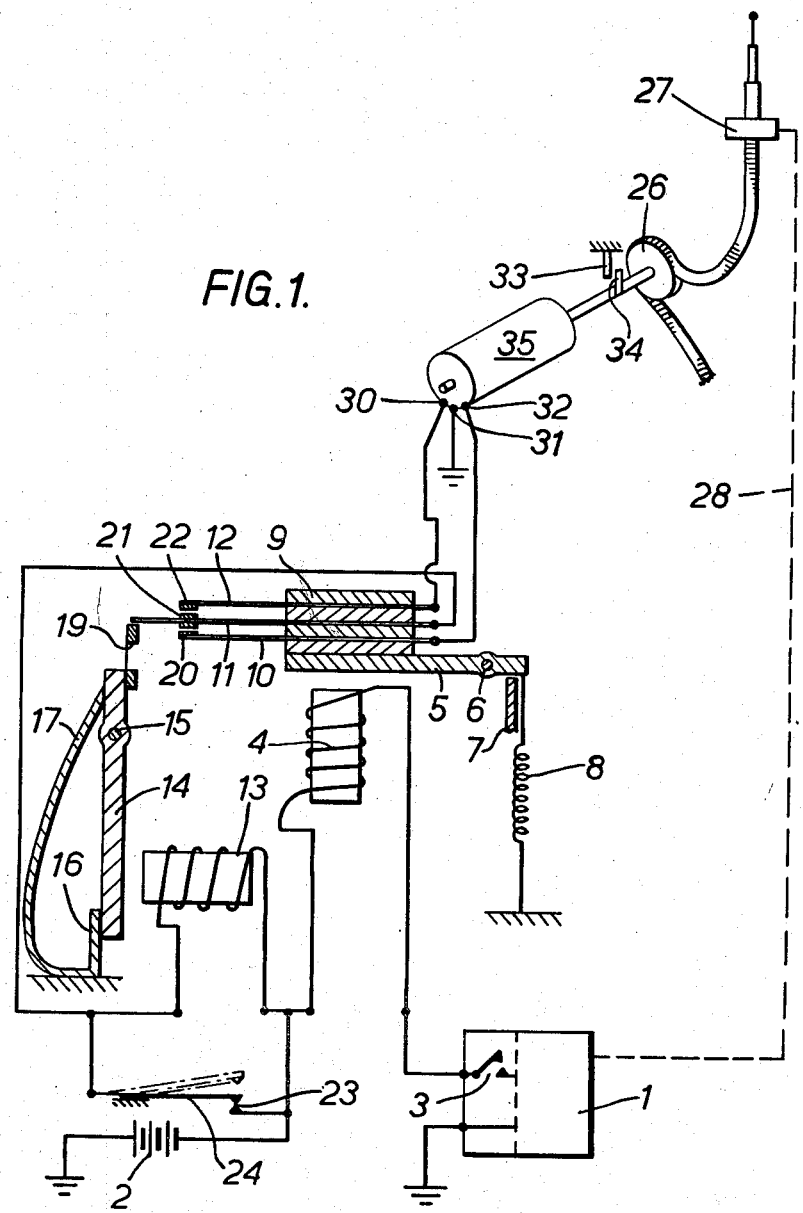

Aug. 4, 1964  R. S. HARRIS  3,143,696
STALLED MOTOR THERMAL STOPPING CONTROL WITH PREPARATION FOR REVERSE
Filed May 2, 1961  2 Sheets-Sheet 2
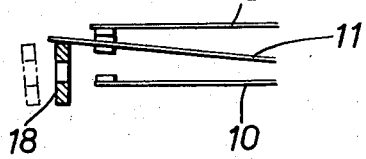
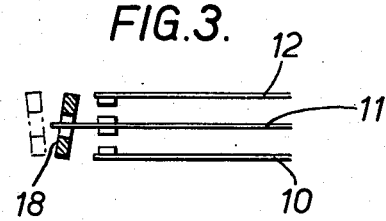
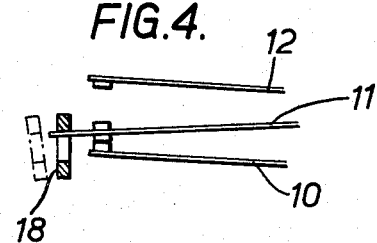

United States Patent Office 3,143,696
Patented Aug. 4, 1964

3,143,696
STALLED MOTOR THERMAL STOPPING CONTROL WITH PREPARATION FOR REVERSE
Royston Sydney Harris, Shepherds Bush, London, England, assignor to S. Smith & Sons (England) Limited, London, England, a British company
Filed May 2, 1961, Ser. No. 107,167
Claims priority, application Great Britain May 5, 1960
10 Claims. (Cl. 318—266)

The present invention relates to electrical actuating apparatus of the kind in which a member is moved by an electric motor through a range determined by at least one stop which mechanically prevents motion of the member beyond the range. It is thus, for example, applicable to electrically actuated extendible and retractable radio aerials whose extension and/or retraction are limited by one or more stops such as are frequently used on motor vehicles.

It is an object of the present invention to provide an electrical actuating device of the kind referred to which does not entail the use of a limit switch or the like, mechanically operated when the stop is reached.

According to the present invention electrical actuating apparatus comprises an electric motor, a member movable by the motor through a range determined by stop means which mechanically prevent motion of the member beyond the range, current responsive means, connecting means connecting the current responsive means in series with the motor during energisation of the motor, and contact means controlled by the current responsive means to de-energise the motor upon persistent excess of the motor current above some predetermined value intermediate between that drawn by the motor when running normally and when stalled.

The predetermined value of current is greater than that drawn by the motor under normal running conditions, but is less than that drawn by the motor when it is stalled. Thus when the motor is energised to drive the member towards the stop the contact means remain closed until the stop is reached. However, when the stop is reached, the persistent overload current of the motor causes the contact means to be opened and the motor to be de-energised.

Preferably the current responsive means comprise a bimetal element actuating a normally closed contact in series with it, the element being responsive to heat generated in it and opening the contact when the sustained current passing through it exceeds the said predetermined value.

Preferably the contact means and the motor are arranged so that after de-energisation of the motor the next energisation is in the opposite sense whereby the direction of rotation of the motor is reversed.

The relevant features of an electrical actuating apparatus for an aerial associated with a vehicle radio set will now be described with reference to the accompanying drawings of which FIGURE 1 is a schematic representation of the apparatus, aerial and radio set, and FIGURES 2 to 4 show leaves 10, 11 and 12 and plate 18 of FIGURE 1 in various modes of operation.

The radio set itself is indicated by the block 1, and is supplied with power from the normal vehicle battery, indicated at 2, through the normal ON/OFF switch indicated at 3, the positive terminal of the battery being earthed.

A relay coil 4 is connected between the battery 2 and the negative power input terminal of the set 1 so that when the switch 3 is closed the coil 4 is energised by the normal current drain of the set. Coil 4 acts on an armature 5 which is pivoted at 6 and held away from coil 4 and against a stop 7 by a spring 8. Armature 5 carries an insulator block 9 which in turn carries three spring leaves 10, 11, 12 one above the other. The leaves carry contacts 20, 21, 22 positioned so that the contact 21 on leaf 11 may engage either contact 20 on leaf 10 or contact 22 on leaf 12 if leaf 11 is appropriately displaced. A further relay coil 13 acts on an armature 14 which is pivoted at 15. Armature 14 is held against a stop 16 and away from coil 13 by a leaf spring 17. A catch plate 18 (see FIGURES 2–4) of insulating material with a slot 19 (see FIGURE 1) is carried by armature 14 and may engage, when coil 13 is de-energised, an extension of leaf 11, either along the upper edge of plate 18 as seen in FIGURE 2, or along the upper edge of slot 19 as seen in FIGURE 3. If coil 13 is energised, catch plate 18 is held clear of leaf 11.

Assuming that coil 13 is de-energised and the leaf 11 lies upon the upper edge of plate 18, if coil 4 is also de-energised leaf 11 is not displaced and contact 21 does not engage either contact 20 or contact 22. If coil 4 is energised, armature 5 rotates about pivot 6 against the action of spring 8, causing leaf 11 to be displaced as a result of its engagement with the plate 18. Contact 21 then engages contact 22 (FIGURE 2). If coil 13 is now energised, catch plate 18 is moved clear of leaf 11 permitting the leaf to return to a central position with respect to leaves 10 and 12, thereby opening contacts 21 and 22. If coil 13 is now de-energised, catch plate 18 returns to its original position with leaf 11 lying within its slot 19 (FIGURE 3). De-energisation of coil 4 now permits armature 5 to return to its original position under the action of spring 8, and leaf 11 is consequently displaced downwards with respect to leaves 10 and 12, so that contacts 20 and 21 engage (FIGURE 4). Energisation of coil 13 followed by its de-energisation permits leaf 11 to spring clear of catch plate 18, opening contacts 20 and 21.

A contact 23 operated by a snap action bimetallic element, indicated at 24, is arranged so that currents passing through the contact when closed also pass through the bimetallic element 24 thereby heating it. Contact 23 is closed when element 24 is cold, and open when the element is at a higher temperature as a result of the sustained passage of a relatively high current. The element 24 and contact 23 are wired in parallel with coil 13. One terminal of relay coil 13 is connected to leaf 11 and the other terminal to the negative terminal of battery 2.

An electric motor indicated at 35 drives a winding drum 26 for a retractable aerial indicated at 27 suitable for mounting on a vehicle. The aerial is connected electrically to radio set 1 as indicated at 28. Motor 35 has terminals 30, 31 and 32, terminal 31 normally being earthed. The motor winding is such that when terminal 30 is energised drum 26 is rotated in such a direction as to extend aerial 27, and when terminal 32 is energised drum 26 is rotated in a direction to retract the aerial. Stops, indicated diagrammatically at 33, 34, limit rotation of the motor appropriately in the extending and in retracting directions. Terminal 30 is connected to leaf 12 and terminal 32 to leaf 10.

The operation of the apparatus will now be described. Switch 3 is closed to energise the set 1. However, this causes coil 4 to be energised and since the parts will initially be in the condition shown in FIGURE 1, leaf 11 will be displaced towards leaf 12 causing contacts 21 and 22 to engage as shown in FIGURE 2. Motor 35 is then energised in a sense to extend aerial 27. The motor current passes through coil 13 in parallel with contact 23 and element 24; but during rotation of the motor, the current drawn by the motor is not sufficient to cause either the relay 13–14 or the bimetallic element 24 to operate. When aerial 27 is fully extended stops 33, 34 engage one another, causing motor 35 to stall. The increased current heats element 24 causing it to open contact 23 with a snap action. The current through coil 13 is then increased to an extent sufficient to operate the relay 13–14, moving plate 18 out of engagement with leaf 11. Contacts 21 and 22 then open, de-energising both the motor and coil 13 thereby permitting plate 18 to return to its normal position, but with leaf 11 within the slot as shown in FIGURE 3. Contact 23 re-closes as element 24 cools.

On switching off the set by means of switch 3, coil 4 is de-energised. Armature 5 now moves upwards displacing leaf 11 towards the leaf 10 as shown in FIGURE 4, contacts 20 and 21 engage, and motor 35 is energised in a sense to retract aerial 27. When the aerial is fully retracted stops 33, 34 again engage one another, and the motor again stalls. The increased current once again causes element 24 to be displaced, opening contact 23. The increased current through coil 13 causes plate 18 to be displaced permitting leaf 11 to return to a central position, thereby opening contacts 20, 21. Motor 35 is now de-energised as is also coil 13. Element 24 returns to its original position closing contact 23. The parts are now once again in the positions shown in FIGURE 1 and ready for a fresh cycle of operations.

It will be appreciated that with the arrangement described it is not necessary for radio set 1 to be modified in any way. However, if the voltage drop produced by coil 4 is found in a particular case to detract from the performance of the set, then it is possible to wire the coil in parallel with the set instead of in series so that the working of the set is not affected. This change will however entail some small modification to the wiring of the radio set.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. Electrical actuating apparatus comprising a reversible electric motor, a member drivable by said motor through a range determined by stop means which mechanically prevent motion of the member beyond the range thereby to stall said motor, current responsive means comprising a bi-metal element connected in series with said motor through normally closed contact means for energizing said motor, said bi-metal element being responsive to heat generated in it for opening said contact means when the current passing through it reaches a sustained value resulting from the stalling of said motor, whereby when said motor is stalled and the current drawn by said motor reaches said sustained value said current responsive means causes said contact means to de-energize the motor and causes said contact means to be set so that upon subsequent actuation the motor is energized in the opposite sense.

2. Apparatus as claimed in claim 1 wherein said contact means comprise three contacts mounted one above the other, the middle one being spring restrained into a mid-position where it does not engage either of the outer ones, the middle contact being connected to the current responsive means and the outer ones to the motor, the middle contact being caused to engage one or other of the outer ones to energize the motor in one or other sense.

3. Apparatus as claimed in claim 2, first relay means comprising said contact means and adapted to be connected to a radio set so as to be energized when the set is energized, the contacts being acted on by the relay so that they tend to move in one direction when the relay is energized and in the opposite direction when the relay is de-energized.

4. Apparatus as claimed in claim 3, second relay means connected in parallel with the bi-metal element and its contact so as to be energized when the current through the element reaches the said sustained value and its contact opens, a latch controlled by said second relay means and normally restraining the said middle contact against movement and which releases the middle contact when the second relay means are energized.

5. Apparatus as claimed in claim 4 wherein the said member comprises an extendable vehicle aerial cooperating with a winding drum driven by the motor.

6. Apparatus as claimed in claim 1 wherein the said member comprises an extendable vehicle aerial cooperating with a winding drum driven by the motor.

7. An electrical actuating apparatus comprising an electric motor rotatable in either of two opposing directions in dependence upon the sense in which said motor is energized, stop means for mechanically preventing rotary motion of said motor beyond the ends of a predetermined range and for stalling said motor when said ends are reached, contact means for controlling the energization of said motor, said contact means being settable to energize said motor in a sense dependent upon the setting of said contact means, and means responsive to the current drawn by said motor, said last-named means being connected in series with said motor and acting on said contact means when said current reaches a value indicating that said motor is stalled for causing the contact means to de-energize said motor and for causing said contact means to be reset so that upon subsequent actuation the motor is energized in an opposite sense to rotate away from one of said ends toward the other end of said range.

8. The apparatus of claim 7 wherein said motor current responsive means comprises a slow-acting bi-metal element.

9. The apparatus of claim 7 wherein said contact means comprises a plurality of contacts forming part of a relay, means for setting said contacts in one direction when said relay is energized and for setting said contacts in a different direction when said relay is de-energized, and switch means for controlling the energization of said relay.

10. The apparatus of claim 7 wherein said motor current responsive means comprises a bi-metal element actuating a switch in series therewith to open said switch when said bi-metal element deflects, and a solenoid having an energization circuit coupled to said switch, said solenoid including a movable element for varying the setting of said contact means with variations in the deflection of said bi-metal element.

References Cited in the file of this patent

UNITED STATES PATENTS

| 2,299,785 | Barrett | Oct. 27, 1942 |
| 2,418,235 | Menzies | Apr. 1, 1947 |
| 2,881,378 | Russell | Apr. 7, 1959 |
| 2,949,608 | Fischer | Aug. 16, 1960 |